US007606351B2

(12) United States Patent
Niwa (10) Patent No.: US 7,606,351 B2
(45) Date of Patent: Oct. 20, 2009

(54) TELEPHONE NUMBER CHANGE NOTIFICATION METHOD AND TELEPHONE NUMBER CHANGE NOTIFICATION SYSTEM (75) Inventor: Tetsuya Niwa, Tokyo (JP)

(73) Assignee: NEC Corporation, Tokyo (JP)

( * ) Notice: Subject to any disclaimer, the term of this patent is extended or adjusted under 35 U.S.C. 154(b) by 849 days.

(21) Appl. No.: 11/128,221

(22) Filed: May 13, 2005

(65) Prior Publication Data
US 2005/0254636 A1 Nov. 17, 2005

(30) Foreign Application Priority Data
May 14, 2004 (JP) ............................. 2004-144235

(51) Int. Cl.
H04M 1/64 (2006.01)

(52) U.S. Cl. ................. 379/88.12; 370/352; 379/88.01; 379/100.08; 379/114.28; 379/156; 379/201.01; 455/551

(58) Field of Classification Search ............. 379/88.02, 379/88.12, 88.25, 221.13, 100.08, 114.28, 379/156, 201.01, 211.02, 88.01; 380/255; 455/461, 551; 713/2; 370/352
See application file for complete search history.

(56) References Cited

U.S. PATENT DOCUMENTS

| 5,303,285 | A | * | 4/1994 | Kerihuel et al. | ............. | 455/461 |
| 5,465,290 | A | * | 11/1995 | Hampton et al. | ......... | 379/88.02 |
| 5,832,061 | A | * | 11/1998 | Rubin | ........................ | 379/88.1 |
| 5,991,368 | A | * | 11/1999 | Quatse et al. | ............. | 379/88.25 |
| 6,088,433 | A | * | 7/2000 | Culli et al. | ............. | 379/114.28 |
| 6,581,159 | B1 | * | 6/2003 | Nevis et al. | ..................... | 713/2 |
| 6,842,449 | B2 | * | 1/2005 | Hardjono | ..................... | 370/352 |
| 7,120,236 | B1 | * | 10/2006 | Schneider | .............. | 379/201.01 |
| 7,336,650 | B2 | * | 2/2008 | Franz et al. | .................. | 370/352 |
| 2002/0172343 | A1 | * | 11/2002 | Culli et al. | ............. | 379/211.02 |
| 2004/0223601 | A1 | * | 11/2004 | Culli et al. | ............. | 379/221.13 |
| 2004/0229644 | A1 | * | 11/2004 | Heie et al. | .................. | 455/551 |
| 2006/0262929 | A1 | * | 11/2006 | Vatanen et al. | .............. | 380/255 |

FOREIGN PATENT DOCUMENTS

| EP | 1395070 A1 | 3/2004 |
| JP | 2001-515636 A | 9/2001 |
| JP | 2002-204313 A | 7/2002 |
| JP | 2003-22253 A | 1/2003 |
| JP | 2004-013891 A | 1/2004 |
| JP | 2004-023414 A | 1/2004 |

OTHER PUBLICATIONS

Database WPI Week, Sep. 2004, Thomas Scientific, London, GB, XP002528424.

* cited by examiner

Primary Examiner—Gerald Gauthier
(74) Attorney, Agent, or Firm—Sughrue Mion, PLLC (57) ABSTRACT A telephone number change notification method is provided in which a calling party is reliably identified when a new telephone number of a called party is notified to the calling party when the called party changed the telephone number. When a telephone exchange detects that a called number is changed based on a subscriber information database, the telephone exchange sends a prompt message asking for sending a telephone number notification request to a calling telephone. The calling telephone creates a digital signature and sends it to the telephone exchange. The telephone exchange forwards it to a new telephone number of a called telephone. The called telephone receives the digital signature and verifies it. If the digital signature is valid, the called telephone notifies a new telephone number to the calling telephone.

20 Claims, 6 Drawing Sheets

TELEPHONE NUMBER CHANGE NOTIFICATION METHOD AND TELEPHONE NUMBER CHANGE NOTIFICATION SYSTEM

This application claims priority to prior Japanese patent application JP 2004-144235, the disclosure of which is incorporated herein by reference.

BACKGROUND OF THE INVENTION

1. Field of the Invention

The present invention relates to a telephone number change notification method and a telephone number change notification system and, in particular, to a telephone number change notification method and a telephone number change notification system for notifying a preselected user of a new telephone number when a telephone number is changed.

2. Description of the Related Art

In general, when a user changes a telephone number or an e-mail address of a communication terminal, such as a telephone, the user notifies his or her relatives and acquaintances to whom he or she needs to notify of a new telephone number or a new e-mail address (hereinafter collectively referred to as a "telephone number") by using snail mail or e-mail. The calling party who received the notification can communicate with the user using the new telephone number without any problem.

If a calling party who does not know the new telephone number calls an old telephone number, a telephone directory assistance service in an exchange generally notifies the calling party of the new telephone number. Accordingly, even a calling party who does not receive the telephone number change notification can access the new telephone number.

However, a user may be forced to change a telephone number and an e-mail address to avoid malicious telephone solicitation, sales, or telephone harassment. Since the telephone directory assistance service notifies anyone of the new telephone number across the board against the user's intent, the telephone directory assistance service does not satisfy the user who desires to avoid unwanted calls.

To notify a person to whom a user wants to tell a new telephone number of the new telephone number, Japanese Unexamined Patent Application Publication No. 2004-23414 (hereinafter referred to as "Document 1") discloses a technology in which a telephone directory management system includes a plurality of communication stations storing telephone directory data and a telephone directory data management server connected to the communication stations via a network. If a telephone number is changed, a user who changed the telephone number notifies other users identified by the user in advance of change information.

That is, the telephone directory data management server receives telephone directory data stored in each of the plurality of communication stations and writes the data to a telephone directory database. When the telephone number or the mail address of any communication station is changed, the telephone directory data management server searches for a communication station that stores the old telephone number based on the telephone directory database in order to notify the communication station of the change information. At that time, in the telephone directory database, communication stations that have to be notified are marked differently from communication stations that do not have to be notified in advance. The change notification is sent to only the communication stations that require the notification.

Additionally, Japanese Unexamined Patent Application Publication No. 2004-13891 (hereinafter referred to as "Document 2") discloses a technology in which a user who wants to notify the mail address change (a registered user) registers his or her old mail address and new mail address to a database server. When another user (a search user) cannot communicate with the registered user using the old address, the search user searches the database server using the old address as a key. If the registered change information is hit, the search user inputs the address and name of the search user and a message as required to the database server. The database server then sends the input data from the search user to the new address of the registered user. Upon receiving the input data, the registered user determines whether the search user is a desired user to be notified of the new address based on the input data from the search user.

In the telephone directory management system disclosed in Document 1, a user who changes his or her telephone number sends change information to other users registered in advance. However, the telephone directory data management server requires a dedicated telephone directory database for storing telephone directory data stored in each communication station. Also, the telephone directory data management server requires a search operation for searching for a communication station to which change information is sent when access information about any communication station is changed. Furthermore, the telephone directory data management server cannot check whether the user to whom the telephone directory data management server sends the change information is a user with whom the user having registered the change information desires to communicate.

In the address change notification system disclosed in Document 2, the user having registered address change determines whether he or she notifies the search user of the address change based on the address and name input by the search user. However, if the address and name input by the search user are improperly used, a stranger knows the changed mail address. Thus, the personal information may be disclosed to unauthorized third parties.

SUMMARY OF THE INVENTION

Accordingly, it is an object of the present invention to provide a telephone number change notification method and a telephone number change notification system for notifying a user of change information after identifying the user as a right person to receive the change information.

In a first aspect of the invention, there is provided a telephone number change notification method in a communication system comprising a first telephone, a second telephone, and a telephone exchange, the telephone exchange carrying out connection between the first telephone and the second telephone based on a telephone number called by the first telephone. The method comprises the steps of: determining, by the telephone exchange, whether the telephone number called by the first telephone has been changed; sending, by the telephone exchange, a prompt message asking for a telephone number notification request with a digital signature to the first telephone if the telephone number has been changed; forwarding, by the telephone exchange, a telephone number notification request with the digital signature sent from the first telephone in response to the prompt message to the second telephone having changed a telephone number; determining, by the second telephone, whether the digital signature in the forwarded telephone number notification request with the digital signature is valid or not; and notifying, by the second telephone, the first telephone of the new changed telephone number if the digital signature is valid.

In a second aspect, a telephone number change notification method of the invention comprises the steps of:

determining, by a telephone exchange, whether the telephone number called by a first telephone has been changed, sending, by the telephone exchange, a prompt message asking for a telephone number notification request with a digital signature to the first telephone if the telephone number has been changed, determining, by the telephone exchange, whether the digital signature in a telephone number notification request with the digital signature sent from the first telephone in response to the prompt message is valid or not, and notifying, by the telephone exchange, the first telephone of a new changed telephone number if the digital signature is valid.

In accordance with a specific feature of the second aspect of the invention, the telephone exchange may send the prompt message asking for a telephone number notification request with a digital signature when the telephone exchange determines that a second telephone which changed a telephone number has registered the first telephone as a calling party having permission to receive a new telephone number in advance.

In accordance with another specific feature of the second aspect of the invention, the telephone exchange may send the notification of the new changed telephone number to the first telephone when the telephone exchange determines that a second telephone which changed a telephone number has registered the first telephone as a calling party having permission to receive a new telephone number in advance.

In a third aspect of the invention, there is provided a telephone number change notification system in a telecommunications system which comprises a first telephone, a second telephone, and a telephone exchange for carrying out connection between the first telephone and the second telephone based on a telephone number called by the first telephone. The telephone exchange comprises a subscriber information database for storing subscriber information including old and new telephone numbers of a telephone, and digital signature requesting means for determining whether the telephone number called by the first telephone has been changed and sending a prompt message asking for a telephone number notification request with a digital signature to the first telephone if the digital signature requesting means determines that the telephone number has been changed based on the subscriber information database.

In accordance with a specific feature of the third aspect of the invention, the telephone exchange further comprises digital signature forwarding means for forwarding the telephone number notification request with the digital signature sent from the first telephone in response to the prompt message to the second telephone having changed a telephone number.

In accordance with a more specific feature of the third aspect of the invention, information indicating a subscriber having permission to receive a new telephone number is entered into the subscriber information database of the telephone exchange in advance by the operation of a telephone which has changed the telephone number and the telephone exchange further comprises notification determination means for determining, based on the subscriber information database, whether a new telephone number of the second telephone is notified to the first telephone when the telephone number of the second telephone has been changed.

The digital signature requesting means may send a prompt message asking for a telephone number notification request with a digital signature to the first telephone based on the determination result of the notification determination means.

In accordance with another specific feature of the third aspect of the invention, the telephone exchange further comprises digital signature verification means for verifying the validity of a digital signature sent from the first telephone in response to the prompt message, and telephone number notification means for notifying the first telephone of the new changed telephone number of the second telephone if the digital signature is valid.

Information indicating a subscriber having permission to receive a new telephone number may be entered into the subscriber information database of the telephone exchange in advance by the operation of a telephone which has changed the telephone number and the telephone exchange further may comprise notification determination means for determining, based on the subscriber information database, whether a new telephone number of the second telephone is notified to the first telephone when the telephone number of the second telephone has been changed.

The digital signature requesting means may send a prompt message asking for a telephone number notification request with a digital signature to the first telephone based on the determination result of the notification determination means.

The telephone number notification means may notify the new telephone number of the second telephone to the first telephone based on the verification result of the digital signature verification means and the determination result of the notification determination means.

In accordance with a yet another specific feature of the third aspect of the invention, one of the first telephone and the second telephone comprises text communication means for transmitting and receiving any of an e-mail and a short message, digital signature generation means for generating a digital signature to ensure the validity of a message, digital signature verification means for verifying the validity of a message; and storage means for storing a telephone directory and information required for generating and verifying a digital signature.

In a fourth aspect of the invention, there is provided a telephone used in the telephone number change notification system which comprises text communication means for transmitting and receiving any of an e-mail and a short message, digital signature generation means for generating a digital signature to ensure the validity of a message, digital signature verification means for verifying the validity of a message, and storage means for storing a telephone directory and information required for generating and verifying a digital signature.

According to the present invention, when a telephone sends a call request to an old telephone number, a prompt message asking for a telephone number notification request with a digital signature is sent to the calling telephone. The calling telephone sends a telephone number notification request with a digital signature in response to the prompt message. The calling telephone can be identified by the digital signature. Thus, a telephone number change notification can be sent after the owner of the calling telephone is identified, and therefore, the personal information is prevented from being disclosed to unauthorized third parties.

DESCRIPTION OF THE PREFERRED EMBODIMENTS

The present invention will be described below with reference to the accompanying drawings.

Figure 1:
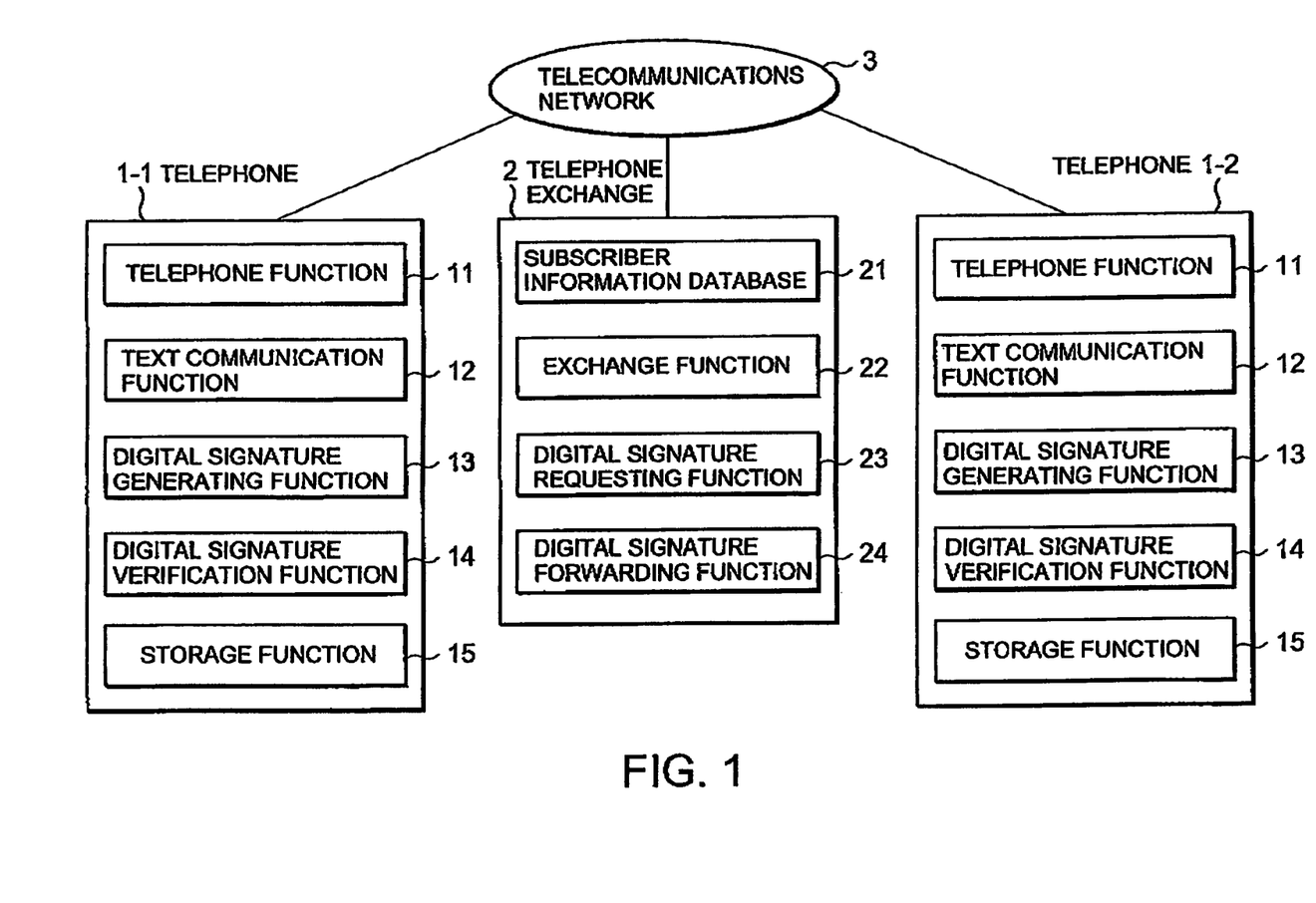
FIG. 1 is a block diagram of a telephone number change notification system according to a first embodiment of the present invention.

FIG. 1 is a block diagram of a telephone number change notification system according to a first embodiment of the present invention. In this system, telephones 1-1 and 1-2 are connected to a telephone exchange 2 via a telecommunications network 3. In practice, a plurality of telephones are connected to the communication network 3. However, for the sake of simplicity, only the telephones 1-1 and 1-2 are shown.

When a calling party of the telephone 1-1 calls the telephone 1-2, the telephone 1-1 is connected to the telephone exchange 2 and places a call request to the telephone number of the telephone 1-2 on the telephone exchange 2. The telephone exchange 2 then carries out connecting operation between the telephones 1-1 and 1-2 based on the telephone number called by the telephone 1-1. Consequently, a telephone conversation becomes possible. The telephones 1-1 and 1-2 may be landline telephones or cellular telephones for mobile communications.

Each of the telephone 1-1 and the telephone 1-2 includes a telephone function, or means, 11, a text communication function, or means, 12 for transmitting and receiving an e-mail or a short message, a digital signature generation function, or means, 13 for generating a digital signature to ensure the validity of a document, a digital signature verification function, or means, 14 for verifying the validity of a document, and a storage function, or means, 15 for storing a telephone directory and information required for generating and verifying a digital signature.

The telephone exchange 2 includes a subscriber information database 21 including an old and new telephone numbers for each telephone, an exchange function, or means, 22 for carrying out connection between telephones based on the subscriber information database 21, a digital signature requesting function, or means, 23 for sending a prompt message asking for a telephone number notification request with a digital signature to a telephone (a calling telephone) that sends a call request to an old telephone number, and a digital signature forwarding function, or means, 24 for forwarding the telephone number notification request with a digital signature sent from the calling telephone to a called party of a new telephone number.

The digital signature is developed for determining whether an electronic document communicated in a communication network is really created by a party himself or herself. This technology is used when various certificates and secret documents are sent and received in a network.

The digital signature generation function 13 generates a digest of a message to be sent using a message digest function, and then encrypts the digest using a private key, which only a sender of the digest can use. Thus, a digital signature is created.

The digital signature verification function 14 generates a digest of a received message using the message digest function. At the same time, the digital signature verification function 14 decrypts the digital signature using a public key that forms a unique pair with the private key of the sender so as to obtain the digest which the sender generates. Thereafter, the two digests are compared with each other. If they are identical, it is determined that the document is created by the sender himself or herself.

Figure 2:
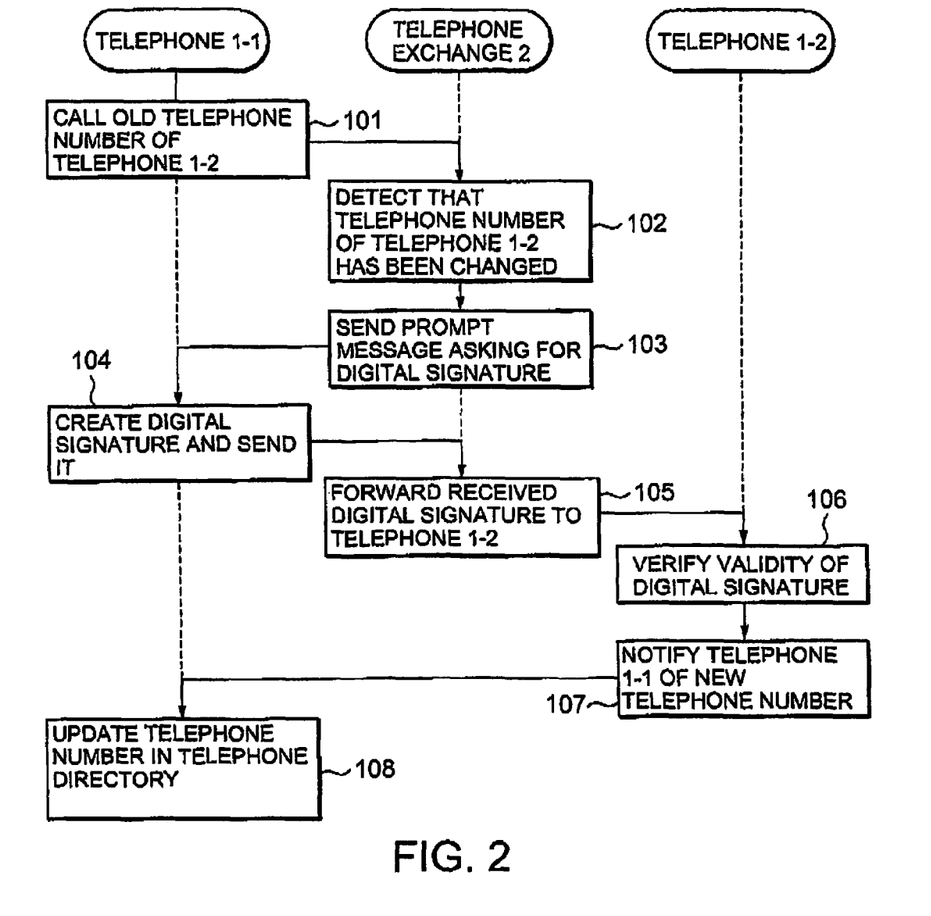
FIG. 2 is a flow chart of the operation of the first embodiment shown in FIG. 1.

FIG. 2 is a flow chart of the operation of the first embodiment shown in FIG. 1.

Here, for example, the telephone number of the telephone 1-2 has been changed. An owner of the telephone 1-1 calls an old telephone number of the telephone 1-2.

First, the owner of the telephone 1-1 sends a call request to an old telephone number of the telephone 1-2 (step 101). The exchange function 22 of the telephone exchange 2 receives the call request and determines whether the called telephone number has been changed by searching the subscriber information database 21. In this example, the exchange function 22 detects that the telephone number of the telephone 1-2 has been changed (step 102). It should be noted that, if the telephone number of the telephone 1-2 has not been changed, the telephone exchange 2 immediately connects the telephone 1-1 to the telephone 1-2.

Here, since the telephone number of the telephone 1-2 has been changed, the digital signature requesting function 23 sends, to the telephone 1-1, a prompt message telling that the called telephone number has been changed and asking for sending a telephone number notification request with a digital signature in order to know a new telephone number (step 103). This message may be an audio guidance or may be text information sent from a text communication function of the telephone exchange 2.

Upon receiving the message asking for sending a telephone number notification request with a digital signature, the owner of the telephone 1-1 generates a digital signature by using the digital signature generation function 13 and sends a telephone number notification request with the digital signature to the telephone exchange 2 by using the text communication function 12 when the owner wants to know the new telephone number of the telephone 1-2 (step 104).

The telephone exchange 2 receives the telephone number notification request with the digital signature, and then forwards it to the telephone 1-2 (step 105).

Upon receiving the telephone number notification request with the digital signature via the telephone exchange 2, the text communication function 12 of the telephone 1-2 determines the validity of the digital signature using the digital signature verification function 14 (step 106).

If the digital signature is verified and if the owner of the telephone 1-2 wants to tell the new telephone number to the owner of the telephone 1-1, the owner of the telephone 1-2 sends the new telephone number of the telephone 1-2 to the telephone 1-1 (step 107).

To tell the telephone number to a requester, for example, the text communication function 12 of a telephone may be used or the Internet may be used via a personal computer (PC). Furthermore, telephone voice or a snail mail may be used. Additionally, the telephone number may be sent along with other information, such as an address and an e-mail address.

Upon receiving the new telephone number, the owner of the telephone 1-1 replaces the telephone number of the telephone 1-2 in a telephone directory stored in the storage function 15 with the new telephone number (step 108).

According to this embodiment, a calling party is identified based on a digital signature and then a new telephone number is notified to the identified calling party. Consequently, the new telephone number can be notified to a right person as a called party who changed his or her telephone number pleases.

Furthermore, according to this embodiment, a subscriber information database of a telephone exchange is searched by using a called telephone number as a key and the memory area corresponding to the subscriber is accessed to determine the change of the telephone number. If the telephone number is changed, the telephone exchange prompts the calling party to send a telephone number notification request. Consequently, a dedicated telephone directory database for managing the change in a telephone directory in each telephone is not required.

Figure 3:
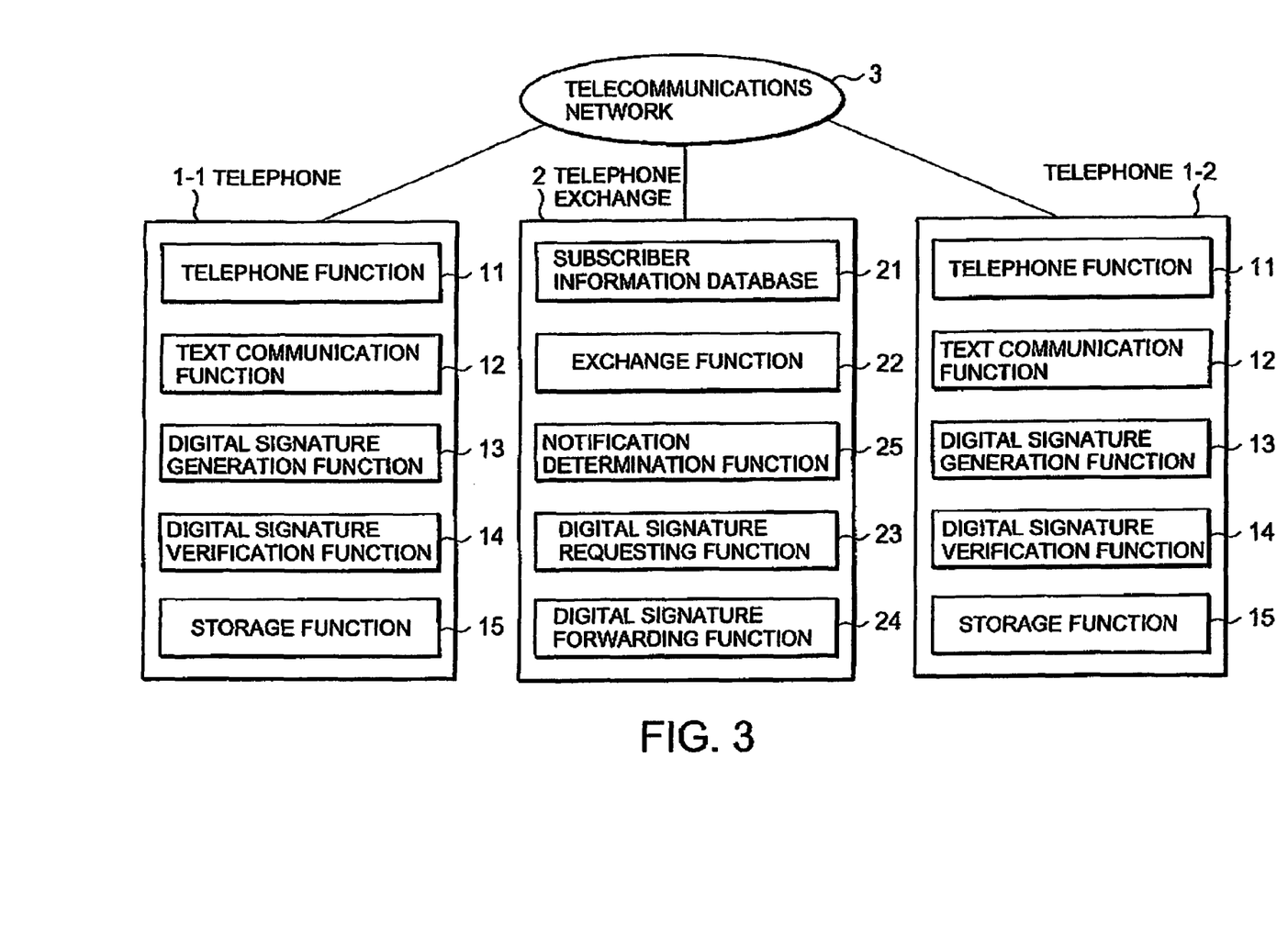
FIG. 3 is a block diagram of a telephone number change notification system according to a second embodiment of the present invention.

FIG. 3 is a block diagram of a telephone number change notification system according to a second embodiment of the present invention.

The second embodiment differs from the first embodiment shown in FIG. 1 in that an owner of a telephone who changes a telephone number tells information about subscribers who are permitted to notify a new telephone number (a calling party having permission to receive a telephone number) to a telephone exchange in advance and requests the telephone exchange to write the information to a subscriber information database. Thus, the telephone exchange sends a prompt message asking for sending a telephone number notification request only to the subscribers having permission to receive a telephone number. In FIG. 3, components identical to those illustrated and described in relation to FIG. 1 are designated by identical reference numerals.

As shown in FIG. 3, a telephone exchange 2 includes a subscriber information database 21 containing subscriber information, such as an old and new telephone numbers and given permission to receive a new telephone number for each telephone. The telephone exchange 2 further includes an exchange function 22 for carrying out connection between telephones based on the subscriber information database 21, a digital signature requesting function 23 for sending a prompt message asking for sending a telephone number notification request with a digital signature to a calling telephone, a digital signature forwarding function 24 for forwarding the telephone number notification request with a digital signature sent from the calling telephone to a called party of a new telephone number, and a notification determination function 25 for determining whether a telephone is given permission to receive a new telephone number by searching the subscriber information database 21.

Figure 4:
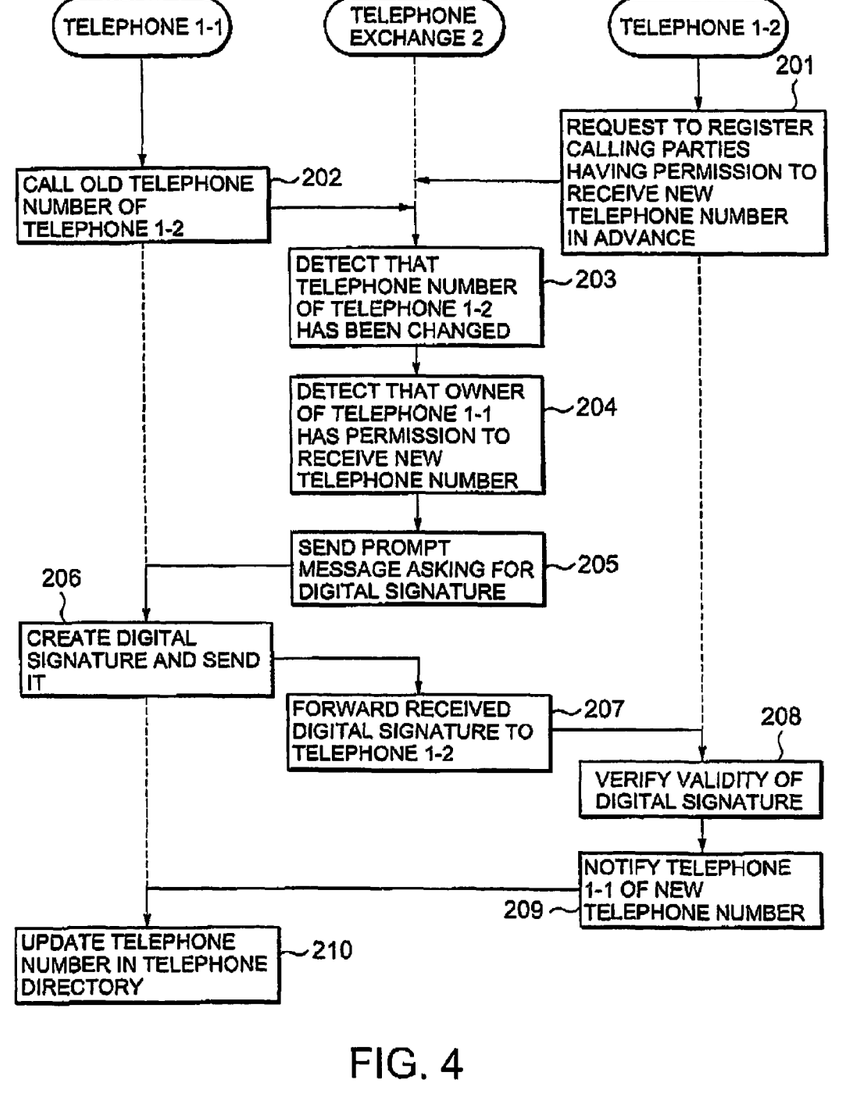
FIG. 4 is a flow chart of the operation of the second embodiment shown in FIG. 3.

FIG. 4 is a flow chart of the operation of the second embodiment shown in FIG. 3.

Here, for example, the telephone number of the telephone 1-2 has been changed, as in the first embodiment. An owner of the telephone 1-1 calls an old telephone number of the telephone 1-2.

An owner of the telephone 1-2 tells information about subscribers who are given permission to receive a new telephone number to the telephone exchange 2 and requests the telephone exchange 2 to register that information into the subscriber information database 21 of the telephone exchange 2 in advance. In this example, the owner of the telephone 1-2 requests the telephone exchange 2 to register the owner of the telephone 1-1 as a subscriber who is given permission to receive a new telephone number (step 201).

The owner of the telephone 1-1 sends a call request to an old telephone number of the telephone 1-2 by using the telephone function 11 (step 202). The exchange function 22 of the telephone exchange 2 receives the call request and then searches the subscriber information database 21 to determine whether the called telephone number is changed. In this example, the telephone exchange 2 detects that the telephone number of the telephone 1-2 is changed (step 203).

Subsequently, the notification determination function 25 of the telephone exchange 2 determines whether the owner of the telephone 1-1 is given permission to receive a new telephone number. In this example, the owner of the telephone 1-1 is registered as a subscriber having permission to receive a new telephone number (step 204). Accordingly, a prompt message asking for a telephone number notification request with a digital signature is sent for the telephone 1-1 in order to know a new telephone number (step S205). If the owner of the telephone 1-1 is not registered as a subscriber having permission to receive a new telephone number, the message is not sent to the telephone 1-1.

Upon receiving the prompt message asking for the telephone number notification request with a digital signature from the telephone exchange 2, the owner of the telephone 1-1 creates a digital signature by using the digital signature generation function 13 and sends it to the telephone exchange 2 when the owner wants to know a new telephone number of the telephone 1-2 (step 206).

The telephone exchange 2 receives the telephone number notification request with the digital signature sent from the telephone 1-1 and then forwards it to the telephone 1-2 (step 207). The text communication function 12 of the telephone 1-2 receives the telephone number notification request with the digital signature from the telephone exchange 2 and then verifies the digital signature using the digital signature verification function 14 (step 208).

If the digital signature is valid and if the owner of the telephone 1-2 wants to tell a new telephone number to the owner of the telephone 1-1, the owner of the telephone 1-2 notifies the telephone 1-1 of the new telephone number (step 209).

Upon receiving the new telephone number, the owner of the telephone 1-1 updates an old telephone number of the telephone 1-2 in a telephone directory stored in the storage function 15 with the new telephone number (step 210).

In the second embodiment, the prompt message asking for the telephone number notification request with the digital signature is sent to only subscribers having permission to receive a new telephone number registered in advance. Accordingly, compared to the first embodiment in which a digital signature is requested to all of the calling parties and the called party verifies the digital signature to determine whether or not the called party notifies a new telephone number, the called party receives no telephone number notification request from a calling party to whom the called party does not want to notify the new telephone number. Thus, the telephone need not verify the digital signature. Additionally, the calling party does not suspect that the called party does not notify a new telephone number intentionally.

Figure 5:
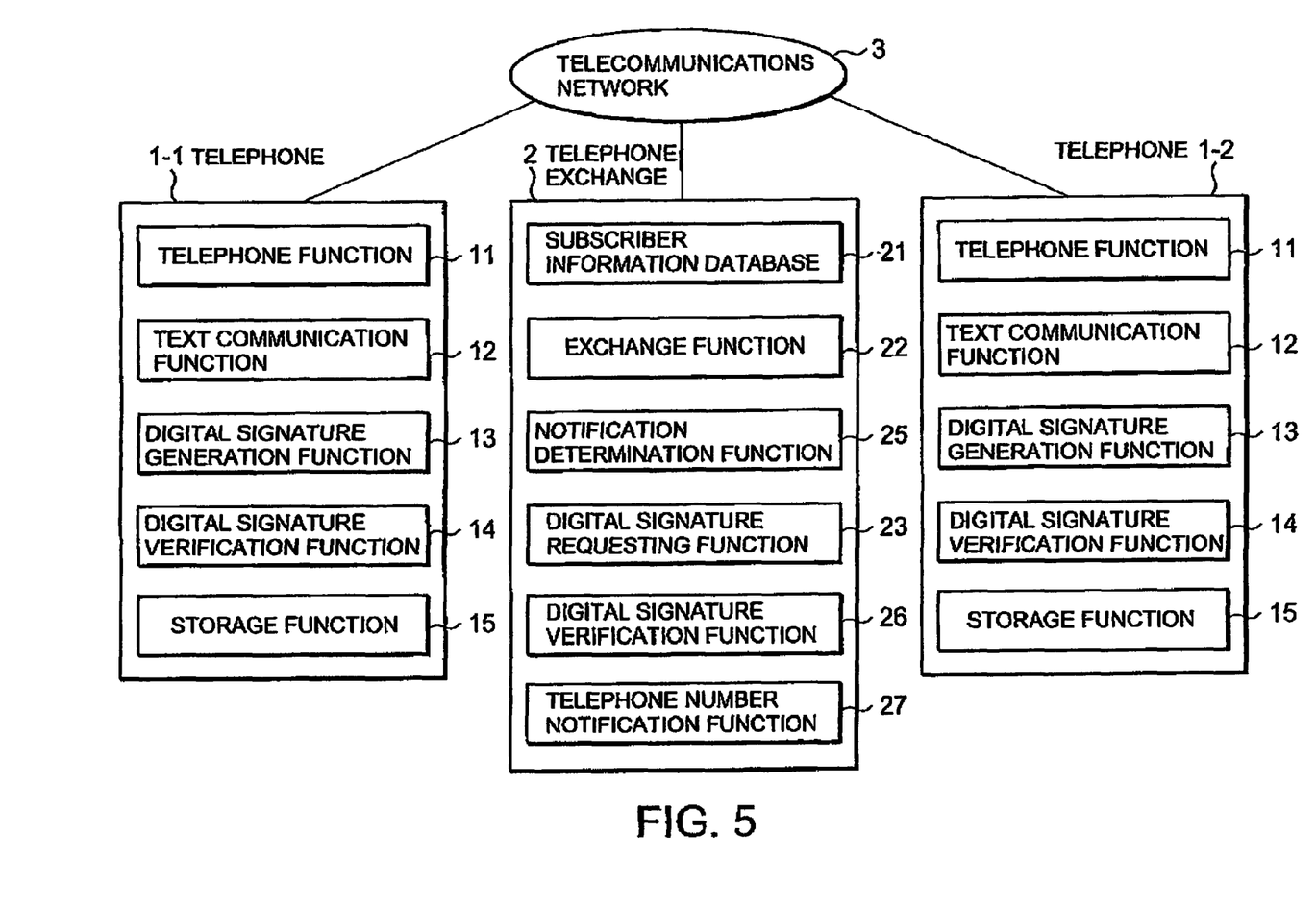
FIG. 5 is a block diagram of a telephone number change notification system according to a third embodiment of the present invention.

FIG. 5 is a block diagram of a telephone number change notification system according to a third embodiment of the present invention.

The third embodiment differs from the second embodiment shown in FIG. 3 in that a telephone exchange provides a digital signature verification function and a telephone number notification function to verify the validity of a digital signature and automatically notify a calling party of a new telephone number. In FIG. 5, components identical to those illustrated and described in relation to FIG. 3 are designated by identical reference numerals.

As shown in FIG. 5, a telephone exchange 2 includes a subscriber information database 21 containing subscriber information, such as an old and new telephone numbers and given permission to receive a new telephone number for each telephone. The telephone exchange 2 further includes an exchange function 22 for carrying out connection between telephones based on the subscriber information database 21, a digital signature requesting function 23 for sending a prompt message asking for sending a telephone number notification request with a digital signature to a calling telephone, a notification determination function 25 for determining whether a telephone is given permission to receive a new telephone number by searching the subscriber information database 21, a digital signature verification function 26 for verifying the validity of a digital signature sent from a calling party, and a telephone number notification function 27 for notifying a calling party of a new telephone number if the validity of the digital signature is verified.

Figure 6:
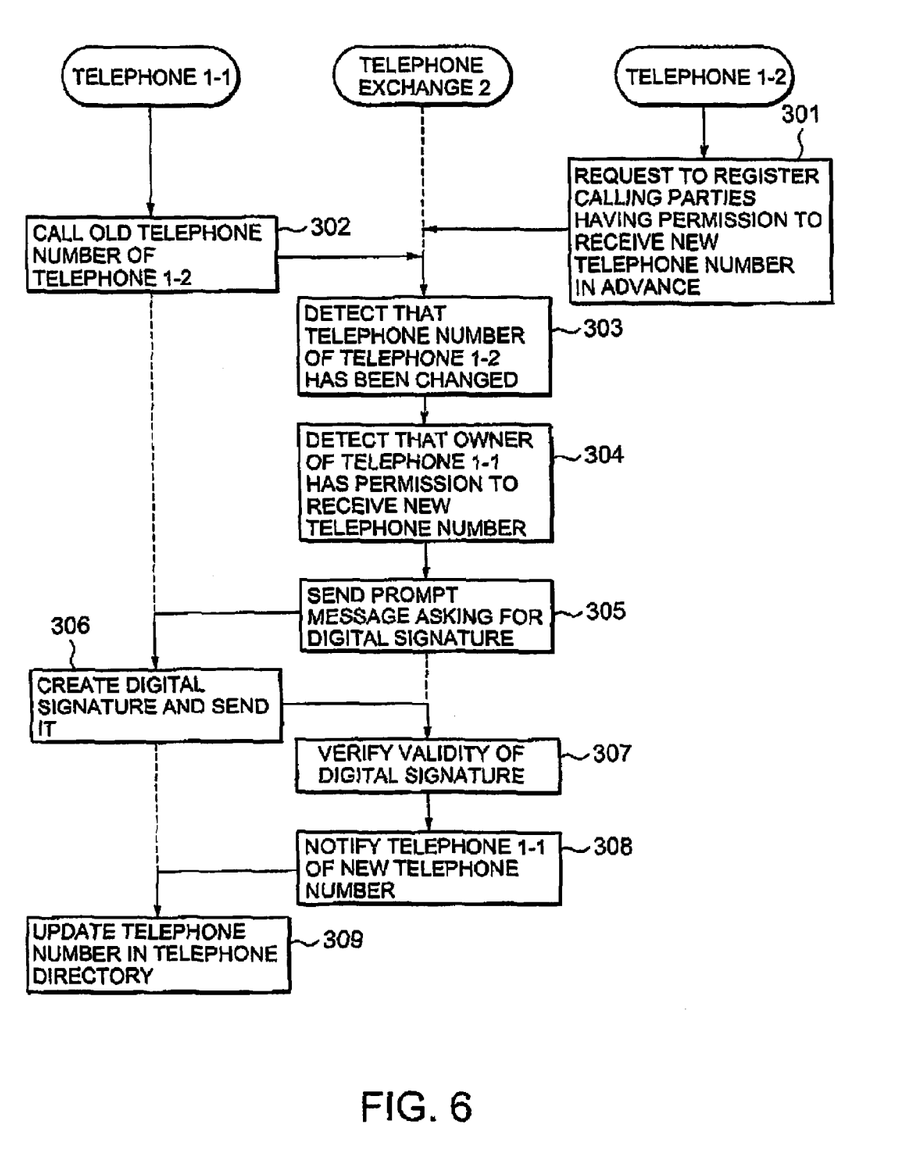
FIG. 6 is a flow chart of the operation of the third embodiment shown in FIG. 5.

FIG. 6 is a flow chart of the operation of the third embodiment shown in FIG. 5.

Here, for example, the telephone number of the telephone 1-2 has been changed, as in the second embodiment shown in FIG. 2. An owner of the telephone 1-1 calls an old telephone number of the telephone 1-2. In addition, an owner of the telephone 1-2 tells the telephone exchange 2 that the owner of the telephone 1-1 is given permission to receive a new telephone number and requests the telephone exchange 2 to store the information in advance.

The owner of the telephone 1-2 who changed the telephone number requests the telephone exchange 2 to register subscribers having permission to receive a new telephone number in the subscriber information database 21 of the telephone exchange 2 (step 301). In this example, the owner of the telephone 1-2 requests the telephone exchange 2 to register the owner of the telephone 1-1 as a subscriber who is given permission to receive a new telephone number.

The owner of the telephone 1-1 sends a call request to the telephone exchange 2, which stores information about subscribers having permission to receive a new telephone number, by using the telephone function 11 (step 302). The exchange function 22 of the telephone exchange 2 receives the call request and then searches the subscriber information database 21 to determine whether the called telephone number is changed. Thus, the telephone exchange 2 detects that the telephone number of the telephone 1-2 is changed (step 303).

Upon detecting the telephone number change, the notification determination function 25 searches the subscriber information database 21 to determine whether the owner of the telephone 1-1 is given permission to receive a new telephone number. In this example, the owner of the telephone 1-1 is registered as a subscriber having permission to receive a new telephone number (step 304). Accordingly, the digital signature requesting function 23 sends, to the telephone 1-1, a prompt message asking for a telephone number notification request with a digital signature in order to know a new telephone number (step 305).

Upon receiving the prompt message asking for the telephone number notification request with a digital signature from the telephone exchange 2, the owner of the telephone 1-1 creates a digital signature by using the digital signature generation function 13 and sends it to the telephone exchange 2 when the owner wants to know a new telephone number of the telephone 1-2 (step 306).

The telephone exchange 2 receives the telephone number notification request with the digital signature sent from the telephone 1-1 and verifies the validity of the digital signature by using the digital signature verification function 26 (step 307).

If the digital signature verification function 26 determines that the digital signature is valid, the telephone exchange 2 notifies the telephone 1-1 of the new telephone number of the telephone 1-2 by using the telephone number notification function 27 (step 308).

Upon receiving the new telephone number, the owner of the telephone 1-1 updates an old telephone number of the telephone 1-2 in a telephone directory stored in the storage function 15 with the new telephone number (step 309).

In the third embodiment, a telephone exchange stores information indicating a subscriber having permission to receive a new telephone number in a subscriber information database in advance in response to a registration request from an owner of a telephone who changed the telephone number. When a calling party sends a call request to an old telephone number, the telephone exchange sends a prompt message asking for a telephone number notification request with the digital signature to the calling party. The telephone exchange then receives a telephone number notification request with the digital signature sent from the calling party in response to the prompt message. If the telephone exchange determines that the digital signature is valid, the telephone exchange automatically notifies the new telephone number. Accordingly, the notification can be made after the calling party is verified to be a right person. Furthermore, in this embodiment, since the telephone exchange verifies the validity of the digital signature, a digital signature verification process in a telephone can be eliminated.

In the foregoing description in relation to FIG. 6, a prompt message asking for a telephone number notification request with the digital signature is sent to a calling party when the notification determination function 25 determines that the calling party is given permission to receive a new telephone number. However, a prompt message asking for a telephone number notification request with the digital signature may be sent to a calling party without checking a given permission to receive a new telephone number. In this case, the digital signature verification function 26 determines the validity of a digital message sent from the calling party in response to the message and the notification determination function 25 determines that the calling party is given permission to receive a new telephone number. Then, the telephone number notification function 27 notifies the calling party of the new telephone number.

What is claimed is:

1. A telephone number change notification method in a communication system comprising a first telephone, a second telephone, and a telephone exchange, the telephone exchange carrying out connection between the first telephone and the second telephone based on a telephone number called by the first telephone, the method comprising the steps of:

determining, by the telephone exchange, whether the telephone number called by the first telephone has been changed;

sending, by the telephone exchange, a prompt message asking for a telephone number notification request with a digital signature to the first telephone if the telephone number has been changed;

forwarding, by the telephone exchange, a telephone number notification request with the digital signature sent from the first telephone in response to the prompt message to the second telephone having changed a telephone number;

determining, by the second telephone, whether the digital signature in the forwarded telephone number notification request with the digital signature is valid or not; and notifying, by the second telephone, the first telephone of the new changed telephone number if the digital signature is valid.

2. The method according to claim 1, further comprising:

receiving the new changed telephone number sent by the second telephone by the first telephone; and updating the telephone number of the second telephone in a telephone directory of the first telephone.

3. A telephone number change notification method in a communication system comprising a first telephone, a second telephone, and a telephone exchange, the telephone exchange carrying out connection between the first telephone and the second telephone based on a telephone number called by the first telephone, the method comprising the steps of:

determining, by the telephone exchange, whether the telephone number called by the first telephone has been changed;

sending, by the telephone exchange, a prompt message asking for a telephone number notification request with a digital signature to the first telephone if the telephone number has been changed;

determining, by the telephone exchange, whether the digital signature in a telephone number notification request with the digital signature sent from the first telephone in response to the prompt message is valid or not; and notifying, by the telephone exchange, the first telephone of a new changed telephone number if the digital signature is valid.

4. The telephone number change notification method according to claim 3, wherein the telephone exchange sends the prompt message asking for a telephone number notification request with the digital signature when the telephone exchange determines that the second telephone which changed a telephone number has registered the first telephone as a calling party having permission to receive a new telephone number in advance.

5. The telephone number change notification method according to claim 3, wherein the telephone exchange sends the notification of the new changed telephone number to the first telephone when the telephone exchange determines that the second telephone which changed a telephone number has registered the first telephone as a calling party having permission to receive a new telephone number in advance.

6. The method according to claim 3, wherein the communication system comprises a plurality of telephones each associated with a subscriber, the method further comprising:

in advance, registering the subscribers having permission to receive the new changed telephone number; and storing the information about the subscribers having the permission to receive the new changed telephone number in a subscriber information database.

7. The method according to claim 6, further comprising:

determining whether a calling party is the registered subscriber according to the subscriber information database; and sending the prompt message asking for the telephone number notification request including the digital signature only to the registered calling parties.

8. The method according to claim 7, further comprising:

receiving the notification request with the digital signature from one of the calling parties;

verifying the validity of the digital signature; and notifying the calling party of the new changed telephone number based on verification.

9. A telephone number change notification system in a telecommunications system, comprising:

a first telephone;

a second telephone; and a telephone exchange for carrying out connection between the first telephone and the second telephone based on a telephone number called by the first telephone;

wherein the telephone exchange comprises:

a subscriber information database for storing subscriber information including old and new telephone numbers of a telephone; and digital signature requesting means for determining whether the telephone number called by the first telephone has been changed and sending a prompt message asking for a telephone number notification request with a digital signature to the first telephone if the digital signature requesting means determines that the telephone number has been changed based on the subscriber information database.

10. The telephone number change notification system according to claim 9, wherein the telephone exchange further comprises digital signature forwarding means for forwarding the telephone number notification request with the digital signature sent from the first telephone in response to the prompt message to the second telephone having changed a telephone number.

11. The telephone number change notification system according to claim 10, wherein information indicating a subscriber having permission to receive a new telephone number is entered into the subscriber information database of the telephone exchange in advance by the operation of a telephone which has changed the telephone number and wherein the telephone exchange further comprises:

notification determination means for determining, based on the subscriber information database, whether the new telephone number of the second telephone is to be notified to the first telephone when the telephone number of the second telephone has been changed.

12. The telephone number change notification system according to claim 11, wherein the digital signature requesting means sends the prompt message asking for the telephone number notification request with the digital signature to the first telephone based on the determination result of the notification determination means.

13. The telephone number change notification system according to claim 9, wherein the telephone exchange further comprises:

digital signature verification means for verifying the validity of the digital signature sent from the first telephone in response to the prompt message; and telephone number notification means for notifying the first telephone of the new changed telephone number of the second telephone if the digital signature is valid.

14. The telephone number change notification system according to claim 13, wherein information indicating a subscriber having permission to receive a new telephone number is entered into the subscriber information database of the telephone exchange in advance by the operation of a telephone which has changed the telephone number and wherein the telephone exchange further comprises:

notification determination means for determining, based on the subscriber information database, whether the new telephone number of the second telephone is to be notified to the first telephone when the telephone number of the second telephone has been changed.

15. The telephone number change notification system according to claim 14, wherein the digital signature requesting means sends the prompt message asking for the telephone number notification request with the digital signature to the first telephone based on a determination result of the notification determination means.

16. The telephone number change notification system according to claim 15, wherein the telephone number notification means notifies the new telephone number of the second telephone to the first telephone based on the verification result of the digital signature verification means and the determination result of the notification determination means.

17. The telephone number change notification system according to claim 9, wherein one of the first telephone and the second telephone comprises:
   text communication means for transmitting and receiving any of an e-mail and a short message;
   digital signature generation means for generating a digital signature to ensure the validity of a message;
   digital signature verification means for verifying the validity of a message; and
   storage means for storing a telephone directory and information required for generating and verifying a digital signature.

18. A telephone used in the telephone number change notification system according to claim 9, comprising:
   text communication means for transmitting and receiving any of an e-mail and a short message;
   digital signature generation means for generating a digital signature to ensure the validity of a message;
   digital signature verification means for verifying the validity of a message; and
   storage means for storing a telephone directory and information required for generating and verifying a digital signature.

19. The telephone number change notification system according to claim 9, wherein the subscriber information database stores information indicating subscribers having permission to receive a new telephone number of the second telephone, the system further comprising:
   notification determination means for determining whether the new telephone number of the second telephone is to be notified to the first telephone when the telephone number of the second telephone has been changed only if a subscriber of the first telephone has the permission, based on the subscriber information database.

20. The telephone number change notification system according to claim 19, wherein the digital signature requesting means sends the prompt message asking for the telephone number notification request with the digital signature to the first telephone based on a determination result of the notification determination means, the system further comprising:
   digital signature verification means for verifying the validity of the digital signature sent from the first telephone in response to the prompt message; and
   telephone number notification means for notifying the first telephone of the new changed telephone number of the second telephone based on a verification result of the digital signature verification means.

* * * * *